March 20, 1928.                         1,662,849
W. H. DAILEY
LAWN MOWER
Filed March 16, 1926
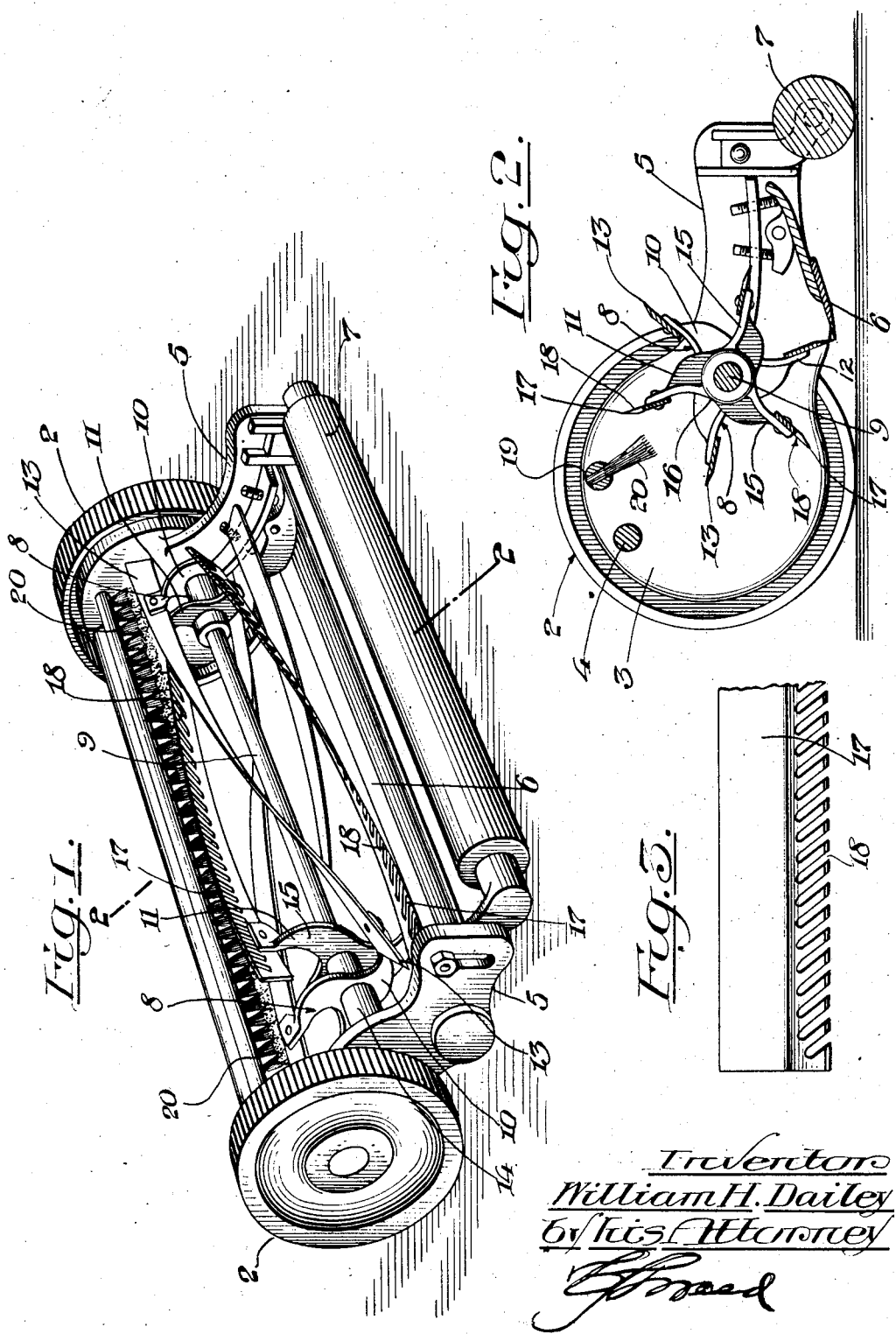

Patented Mar. 20, 1928.

1,662,849

UNITED STATES PATENT OFFICE.

WILLIAM H. DAILEY, OF BROOKLYN, NEW YORK.

LAWN MOWER.

Application filed March 16, 1926. Serial No. 95,012.

This invention relates to lawn mowers, the object of the invention being to provide an improved lawn mower, so constructed that it will more efficiently mow the lawn, especially when the grass has considerable growth or has a quantity of weeds therein, and which lawn mower is simple in construction and comparatively inexpensive to manufacture.

A further object of the invention is the provision of a lawn mower, having improved means for gathering in the relatively tall grass and weeds, thereby to insure the cutting thereof by the cutting blades or knives of the mower and which weed-gathering means can be readily applied to lawn mowers now on the market without any change in the structure thereof.

A further object of the invention is the provision in a lawn mower of means for cleaning or freeing the rotating blades or knives from the cut particles of grass and weeds, thereby to prevent the clogging of the knives thus insuring a more efficient operation of the machine.

In the drawings accompanying and forming a part of this specification, Figure 1 is a perspective view illustrating this improved lawn mower; Figure 2 is a cross sectional view taken on line 2—2, Figure 1; and Figure 3 is a detailed view of one of the gathering-in blades.

Similar characters of reference indicate corresponding parts in the several figures of the drawings.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In the present improved lawn mower, the construction thereof in the main is substantially similar to well known forms of mowers on the market and comprises a pair of flanged wheels 2, carrying the usual disks 3 connected by a rod 4. These disks are provided with a pair of forwardly extending arms 5 carrying the usual stationary knife or blade 6 and a rest or guide roll 7. Also connected to these disks is what is usually termed a cutting reel 8 comprising a rotary shaft 9 suitably connected to the usual gearing located in the flanged wheels whereby the shaft and blades carried thereby are rotated on the pushing of the lawn mower. This reel usually comprises a spider consisting of two spaced sets of radially extending arms to which the knives or cutting blades are connected. In the present improvement the reel comprises a pair of spiders 10 and 11, each consisting of two spaced sets of radially extending arms, the arms 12 of the spider 10 having cutting knives or blades 13 connected thereto in the usual manner and terminating in hubs 14 carried by the rotary shaft 9, while the arms 15 of the spider 11 also have hubs 16 secured to the rotating shaft 9 inside of the radial arms carrying the cutting blades. These arms 15 are provided with gathering-in blades 17 each located between a pair of cutting blades and each is provided with a series of teeth 18 located at an angle to the body of the blade all inclined or extending in the same direction. They are so located that on the downward movement of the blades toward the stationary blade they will gather in the weeds or tall grass and carry them toward the fixed or stationary blade, so that the cutting blades will quickly sever the same during the rotation of the knives. These gathering-in blades thus act to prevent the mower from passing over and flattening down the tall grass and weeds as is usually the case with ordinary mowers, as they not only gather in the weeds and tall grass, but by reason of the inclination of the teeth they carry the weeds and grass to the fixed blade and so hold them that the rotary knives will quickly and easily sever the same.

I have found in practice that the gathering-in process is much more efficiently accomplished by having the teeth inclined all in the same direction, as there is nothing along the outer ends of the teeth to prevent the passage of the weeds or tall grass between the teeth. I have also found that much better results are obtained by locating the gathering-in blades, not only between the cutting blades, but equally spaced from each pair of cutting blades, so there is substantially the same space between the gathering-in blade and the preceding cutting blade as there is between the gathering-in blade and the succeeding cutting blade, in consequence of which the opportunity for the gathering-in blades to pass over and not gather in the weeds and tall grass is lessened. In the present improvement this important advantage is obtained by mounting the gathering-in blades upon a separate spider preferably located inside of the spider carrying the cutting blades without, however, interfering with the length of the gathering-in blades, which in the construction shown have substantially the same length as the cutting blades and the same general ogee curvature or form. As a result, also, of this construction, I am able readily to attach a set of gathering-in blades to the ordinary mower by merely detaching the rotary shaft and applying thereto the spiders carrying the gathering-in blades.

Connected to the disks is a rod 19 and this rod carries bristles 20, preferably formed of flexible wire, and this brush is so located that it will wipe or sweep the several blades of the mower and maintain them clean from the surplus cut grass that usually clogs the rotating parts of the mower. This brush may be supported in position in any other suitable way, as for instance by being connected to the connecting rod 4 hereinbefore referred to, but is preferably supported in the manner herein shown.

Thus I have provided an improved lawn mower, having a plurality of cutting blades and a plurality of alternately located gathering-in blades, each substantially equally spaced from a pair of cutting blades, each gathering-in blade being provided along its outer edge with a series of relatively closely arranged teeth all inclined in the same direction, at an angle to the edge of the blade and so located as quickly to gather in the relatively tall grass and weeds, which would not ordinarily be cut by the cutting blades and each of which gathering-in blades acts to lay the tall grass and weeds over the fixed or stationary blade, whereby they will be cut by the succeeding cutting blade, and in which also the surplus cut grass or weeds will be freed from the blades by the brush so that the blades will be kept clean and free for their normal operation.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a lawn mower, the combination of a stationary cutting blade, a rotating reel provided with grass cutting blades and a gathering-in blade located between and substantially equally spaced from a pair of cutting blades and having a series of teeth having substantially parallel edges and all inclined at the same angle in the same direction from the inner ends thereof.

2. In a lawn mower, the combination of a stationary cutting blade, a rotating reel provided with grass cutting blades and a gathering-in blade having a series of teeth having substantially parallel edges and all inclined at the same angle in the same direction from the inner ends thereof and means for wiping the blades.

3. In a lawn mower, the combination of a stationary cutting blade, a rotating reel provided with grass cutting blades and a plurality of gathering-in blades, each located between and substantially equally spaced from a pair of cutting blades and having a series of teeth having substantially parallel edges and all inclined at the same angle in the same direction from the inner ends thereof, and means for wiping the blades and comprising a flexible wire brush.

4. In a lawn mower, the combination of a stationary cutting blade, a rotating reel provided with grass cutting blades and a plurality of gathering-in blades, each located between and substantially equally spaced from a pair of cutting blades and each having a series of teeth having substantially parallel edges and all inclined at the same angle and in the same direction from the inner ends thereof, and means located in a position to wipe the blades and comprising a brush.

5. In a lawn mower the combination of a fixed blade, a series of rotating blades, and a series of alternately located gathering-in blades, each provided with a series of teeth having substantially parallel edges and all inclined in the same direction from the inner ends thereof.

6. In a lawn mower, the combination of a fixed blade, a rotating shaft, a spider carried thereby and comprising two spaced sets of radially extending arms, cutting blades carried by said arms, an independent spider also carried by said shaft and likewise comprising two spaced sets of radially extending arms, tooth-formed gathering-in blades carried by said arms and each located intermediate of a pair of cutting blades, the arms carrying the gathering-in blades being located between the arms carrying the cutting blades the gathering-in and cutting blades rotating simultaneously and cooperating to gather in and cut the grass during the rotation of the rotating shaft.

7. In a lawn mower, the combination of a fixed blade, a rotating shaft, a spider carried thereby and comprising two spaced sets of radially extending arms, cutting blades carried by said arms, an independent spider also carried by said shaft and likewise comprising two spaced sets of radially extending arms, a series of tooth-formed gathering-in blades carried by said arms and each located intermediate of a pair of cutting blades, the arms carrying the gathering-in blades being located between the arms carrying the cutting blades the gathering-in and cutting blades rotating simultaneously and cooperating to gather in and cut the grass during the rotation of the rotating shaft, and a brush located in position to wipe the several blades.

8. In a lawn mower, the combination of a fixed blade, a rotating shaft, a spider carried thereby and comprising two spaced sets of radially extending arms, cutting blades carried by said arms, an independent spider also carried by said shaft and likewise comprising two spaced sets of radially extending arms, a series of curved tooth-formed blades carried by said arms, and each located intermediate of a pair of cutting blades, the arms carrying the tooth-formed blades being located between the arms carrying the cutting blades, and a brush located in position to wipe the several blades and having a flexible wire formation.

9. In a lawn mower, the combination of a fixed blade, a rotating shaft, a spider carried thereby and comprising two spaced sets of radially extending arms, cutting blades carried by said arms, an independent spider also carried by said shaft and likewise comprising two spaced sets of radially extending arms, tooth-formed blades carried by said arms and each located intermediate of a pair of cutting blades and substantially equally spaced therefrom and having a series of teeth all inclined at the same angle in the same direction, and means for wiping the blades during the rotation thereof.

Signed at 15 Park Row, New York city, N. Y. this 15th day of March, 1926.

WILLIAM H. DAILEY.